United States Patent [19]
Imazeki et al.

[11] 3,895,303
[45] July 15, 1975

[54] OSCILLATOR-ACTUATED BANDSWITCH

[75] Inventors: Kazuyoshi Imazeki; Masao Nakano, both of Tokyo, Japan

[73] Assignee: General Research of Electronics, Inc., Chicago, Ill.

[22] Filed: Sept. 4, 1973

[21] Appl. No.: 394,164

[52] U.S. Cl. .......... 325/470; 178/DIG. 15; 325/334; 325/459; 325/460; 325/465; 334/18

[51] Int. Cl. .......... H04b 1/32

[58] Field of Search .......... 325/334, 335, 452, 453, 325/458, 459, 460, 462, 464, 465, 470; 343/205, 206; 334/14, 15, 18, 86, 87; 178/DIG. 15

[56] References Cited

UNITED STATES PATENTS

| | | | |
|---|---|---|---|
| 3,559,075 | 1/1971 | Okazaki | 325/459 |
| 3,596,183 | 7/1971 | Spies | 178/DIG. 15 |
| 3,646,450 | 2/1972 | Ma | 325/465 |
| 3,665,318 | 5/1972 | Hoffman et al. | 325/459 |
| 3,755,743 | 8/1973 | McLernon | 325/459 |
| 3,801,922 | 4/1974 | Muszkiewicz | 325/459 |
| 3,821,651 | 6/1974 | Fathauer et al. | 325/470 |

*Primary Examiner*—Robert L. Griffin
*Assistant Examiner*—Marc E. Bookbinder
*Attorney, Agent, or Firm*—Fitch, Even, Tabin & Luedeka

[57] ABSTRACT

A signal-seeking receiver automatically scans a plurality of channels of respective predetermined radio frequencies lying in a plurality of frequency bands. The channels are tuned in successively by successively coupling respective tuning crystals into the tuning circuit of respective local oscillators which produce the beating signals for heterodyning in respective RF sections of the receiver. At least one band-switching system responsive to oscillations from a respective local oscillator provides a control signal for enabling the respective RF section of the receiver. Scanning is stopped upon receiving a signal.

8 Claims, 2 Drawing Figures

OSCILLATOR-ACTUATED BANDSWITCH

Figure 1:
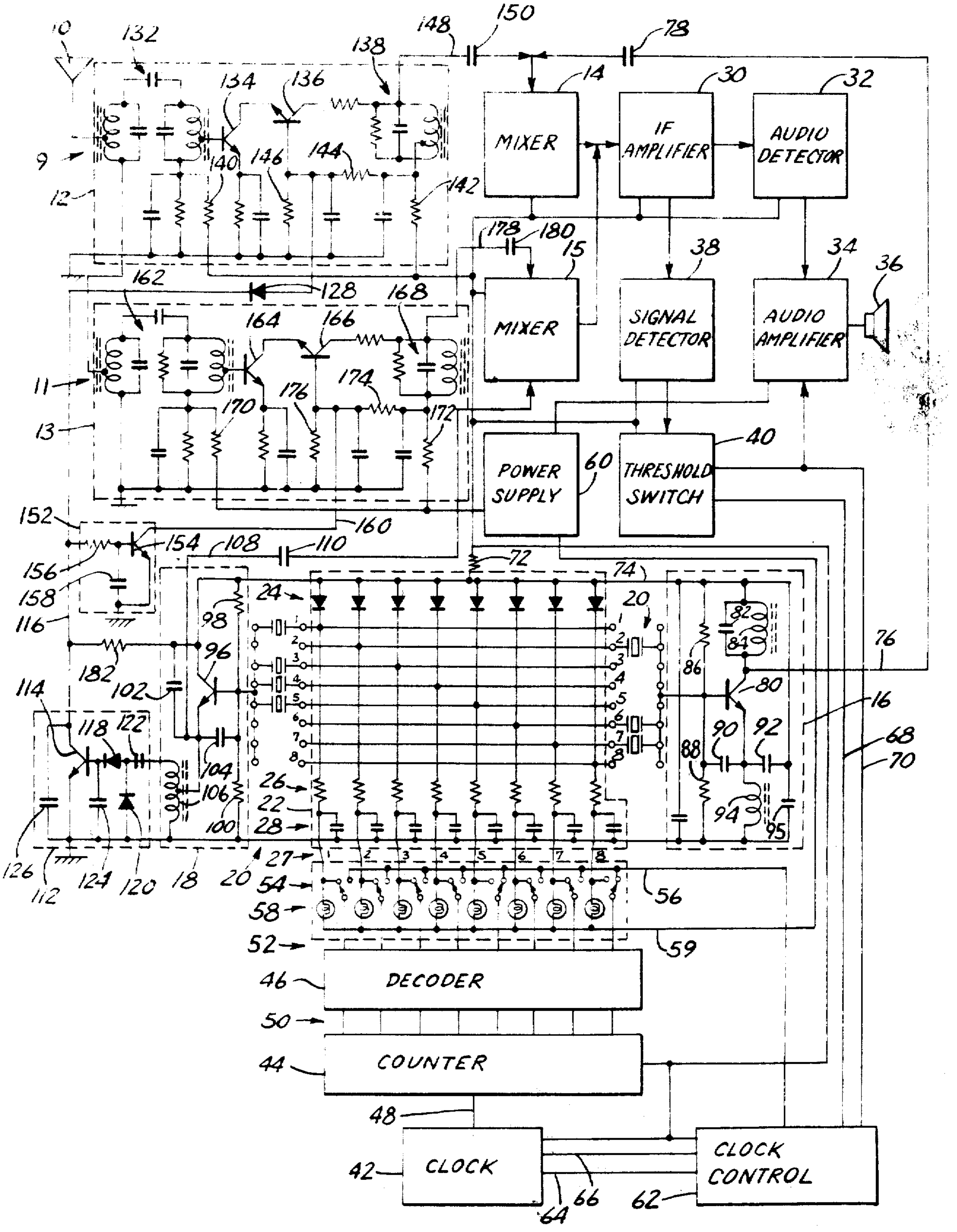

The present invention relates generally to signal-seeking receivers and particularly to such receivers which scan a predetermined plurality of frequencies and automatically tune to a received signal having a frequency corresponding to one of the predetermined frequencies. Still more particularly, the present invention relates to such receivers wherein the plurality of frequencies are in at least two different frequency bands.

Signal-seeking receivers are well known for their convenience in automatically tuning to any one of a plurality of frequencies such as those corresponding to television channels, broadcast radio stations or two-way communications channels. With the advent of solid-state electronic circuitry, conventional signal-seeking receivers have been developed which generally operate more efficiently and accurately than predecessor systems employing electric motors or series of relays for varying the tuning portions of the receivers.

One particularly attractive application for a signal-seeking receiver is a two-way communications system having a plurality of frequencies or channels. In such a system, a signal-seeking receiver enables the listener to monitor all of the stations without having to tune the receiver manually to each of the stations continuously. Moreover, the signal-seeking receiver is especially convenient for a two-way receiver because the listener often has his hands occupied.

One such system, which includes provision for skipping channels in which the operator is not interested, is disclosed in the copending application of Kazuyoshi Imazeki Ser. No. 266,712, filed June 27, 1972 now Pat. No. 3,794,925 for "Frequency-Skipping System for a Signal-Seeking Receiver." The present invention comprises an improvement on such system wherein frequencies may be selected in more than one frequency band. The present invention is not restricted to a frequency-skipping system, however. In accordance with the present invention respective frequency-determining crystals are associated with particular respective local oscillators whereby the selection of a particular crystal causes the respective one of the oscillators to oscillate. The output of a particular oscillator is utilized to operate a band switch to control which band of a multiband receiver is operated, thus permitting reception of signals at a predetermined number of preselected frequencies in a plurality of frequency bands. Any one of the channels may be in any one of the bands.

It is therefore an object of the invention to provide an improved signal-seeking receiver for automatically scanning a predetermined plurality of frequencies in a plurality of frequency bands, particularly a receiver wherein any one of the receiving channels may be tuned to a frequency in any one of the frequency bands. It is another object of the invention to provide such a system wherein separate local oscillators are provided for each of the bands and the output of an oscillator is utilized to operate a band switch for selecting the appropriate frequency band.

Figure 2:
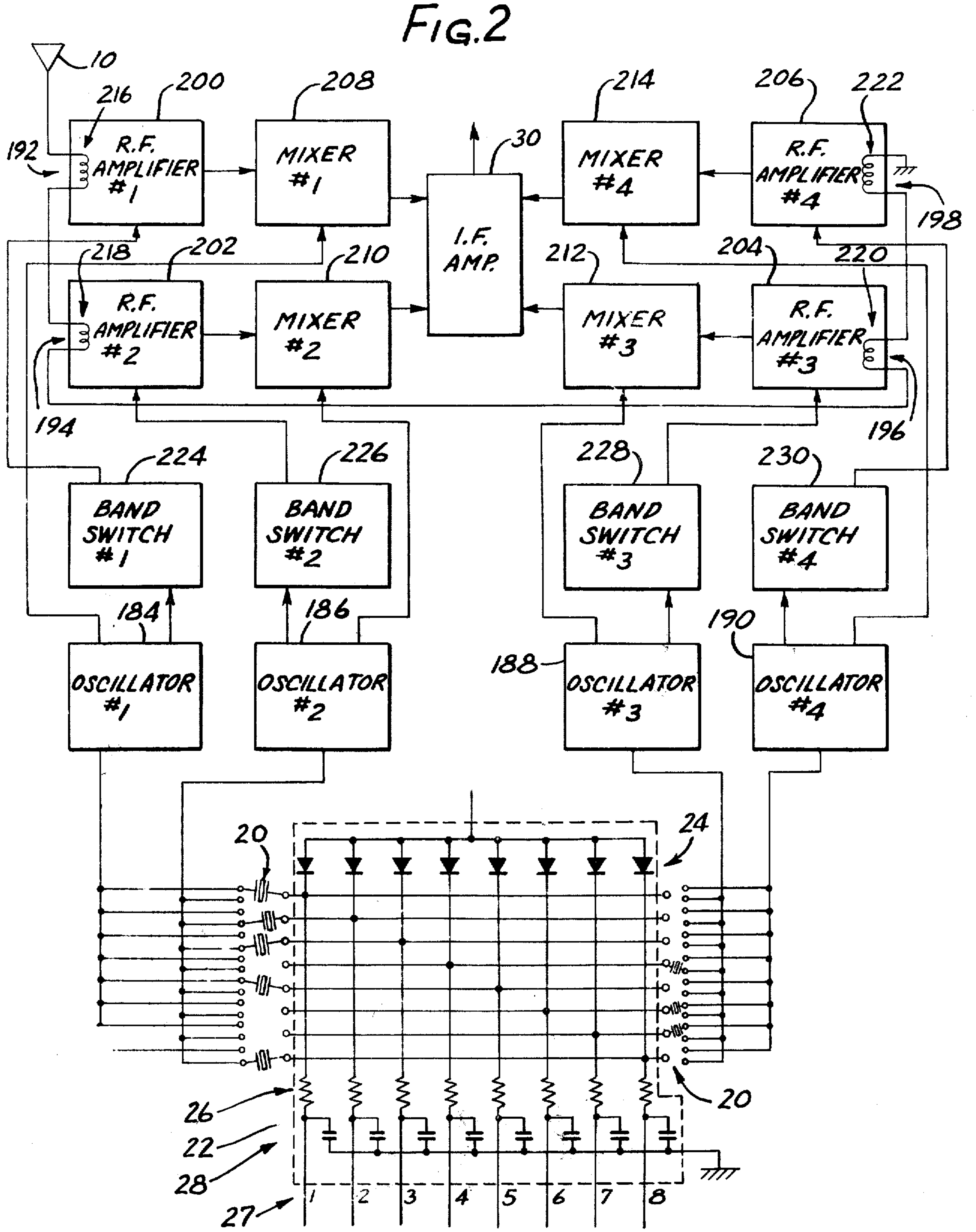

Other objects and advantages of the invention will be evident from the following detailed description, particularly when taken in conjunction with the accompanying drawings, wherein:

FIG. 1 is an electrical schematic diagram of a preferred embodiment of the multiband signal-seeking receiver of the present invention; and FIG. 2 is an electrical schematic diagram of an alternative embodiment of the present invention where the channels may be in any of four bands.

Referring to FIG. 1, the illustrated embodiment of the receiver comprises an antenna 10 for receiving a plurality of radio signals and for applying the signals to respective RF sections 9 and 11, comprising respective first and second band RF amplifiers 12 and 13 and first and second superheterodyne mixers 14 and 15. The received RF signals are amplified by the RF amplifiers 12 and 13 and the amplified signals are applied to the inputs of the respective mixers 14 and 15. At the same time the output of a first band local oscillator 16 is applied as a beating signal to the input of the first mixer 14, and the output of a second band local oscillator 18 is applied as a beating signal to an input of the second band mixer 16. The frequencies of the respective first and second band local oscillators are determined by respective crystals 20 coupled to the frequency-determining circuits of the respective local oscillators 16 and 18.

As shown, there may be eight channels, 1-8. A different crystal 20 is provided for each channel, with each crystal being connected to one or the other of the frequency-determining circuits of the respective oscillators 16 and 18. The crystals 20 are physically disposed for coupling to one or the other of the oscillators. The actual effective electrical coupling of a respective crystal 20 to a respective oscillator 16, 18 is performed by a diode-switching array 22 which includes for each channnel a switching diode 24, a resistor 26 connected between the diode 24 and an input lead 27, and a capacitor 28 connected between the input lead 27 and ground. The particular crystal 20 and the particular oscillator 16, 18 to which it is coupled determines which oscillator produces a beating signal and the frequency of that signal. Thus only one of the oscillators at a time produces a beating signal and that signal is applied to the respective mixer 14 or 15.

The outputs of the respective mixers 14 and 15 are IF signals which are applied to and amplified by an IF amplifier 30 in a conventional manner. The amplified output of the IF amplifier 30 is applied to an audio detector 32 which operates in a conventional fashion to produce an audio signal. The audio signal is applied to an audio amplifier 34 which amplifies the signal and applies the amplified audio signal to a speaker 36.

At the same time an output from the IF amplifier 30 is applied to a signal detector 38 which operates in a conventional fashion to produce a signal when a signal is being received on the channel to which the receiver is tuned. The output of the signal detector 38 is applied to a threshold switch 40 which produces a control signal whenever the output of the signal detector falls below a predetermined threshold level. This control signal is applied to the audio amplifier 34 as a muting or squelching signal to disable or mute the audio amplifier 34 when the receiver is not receiving a sufficiently strong signal on the channel to which it is tuned, so that annoying, non-intelligence sounds are not produced at the speaker 36.

In accordance with the embodiment of the invention illustrated in FIG. 1, the placing of a particular crystal 20 in the frequency-determining circuit of a respective oscillator 16, 18 is achieved by a sequential switching system comprising a clock 42, a counter 44 and a decoder 46 each of which may take the form of the corresponding circuit illustrated in the aforesaid copending application Ser. No. 266,712 now Pat. No. 3,794,925; that is, the clock 42 may comprise a blocking oscillator which produces clock pulses periodically on a conductor 48 over which the clock pulses are applied to the counter 44. The counter 44 may comprise an arrangement of JK flip-flop circuits which count the clock pulses applied over the conductor 48 and produce signals in parallel binary form on conductors 50 over which the binary signals are applied to the decoder 46. The decoder 46 operates in a conventional manner to convert the parallel binary signals into successive signals on respective output conductors 52 each corresponding to one channel of the receiver. The conductors 52 are successively driven to ground potential one at a time. The conductors 52 are connected to respective switches 54. The switches 54 are each manually operable between two positions, one connecting a conductor 52 to a respective input lead 27 and the other connecting a conductor 52 to a conductor 56. Indicator lamps 58 are connected between respective input leads 27 and a common conductor 59 connected to a power supply 60.

The clock 42 is controlled by a clock control circuit 62 from which signals are applied over conductors 64 and 66. The clock control ciruit 62 may be of the sort illustrated in the aforesaid application Ser. No. 266,712 now Pat. No. 3,794,925, receiving signals from the threshold circuit 40 over conductors 68 and 70. When the signals from the threshold switch 40 indicate that a signal is being received on the channel to which the receiver is tuned, the clock control circuit 62 produces signals to stop the clock 42, hence stopping the scanning on a channel that is being received. When the signals from the threshold switch 40 indicate that no signal is being received, the clock control circuit 62 starts the clock 42 to resume scanning.

When the switches 54 are in the position connecting the conductors 52 to the conductor 56, the scanning circuit bypasses the respective channels. More particularly, when the switches 54 are in the position shown for channels 5 and 8, a ground signal is applied to the conductor 56 when the decoder 46 develops the ground signal for those respective channels. This ground signal is applied to the clock control circuit 62 to cause the clock 42 to advance even when the signals from the threshold switch 40 would indicate that a signal is being received.

With the switches 54 in the position illustrated for channels 1–4, 6 and 7, a ground signal on the respective conductor 52 causes a respective diode switch 24 to be conductive, hence placing a respective crystal 20 in the tuning circuit of one of the oscillators 16 and 18. At the same time this provides a current path from the power supply 60 through a respective indicator lamp 58, thereby turning that lamp on to indicate to which of the channels the receiver is tuned. The diode switches 24 are biased by positive potential supplied from the power supply 60 through a resistor 72 to a conductor 74.

Power is supplied to the oscillators 16 and 18 from this conductor 74. The oscillator 16 may be, as shown, the same as the corresponding oscillator shown in the aforesaid copending application Ser. No. 266,712 now Pat. No. 3,794,925, producing an output signal on a conductor 76 which is coupled through a coupling capacitor 78 to the mixer 14. The oscillator 16 may comprise a transistor 80, the base of which is connected to the various crystals 20 for tuning the receiver to channels in the first band. The collector of the transistor 80 may be connected to the supply voltage on the conductor 74 through a tank circuit comprising a capacitor 82 and an inductor 84. The base is biased by a voltage divider comprising a resistor 86 connected from the base to the conductor 74 and a resistor 88 connected between the base and ground. The emitter is coupled to the base by a capacitor 90 and to the conductor 74 by a capacitor 92. The emitter is coupled to ground by an inductor 94. Capacitor 95 is coupled between the conductor 74 and ground. The oscillator 16 thus oscillates at a frequency determined by a respective crystal 20 when the respective crystal 20 is coupled to the frequency-determining circuit of the oscillator 16 by operation of a respective diode switch 24 under the control of scanning signals developed sequentially on the conductors 52.

Similarly, the oscillator 18 comprises a transistor 96 with its base connected to respective crystals 20 and to a voltage divider formed by a resistor 98 connected to the conductor 74 and a resistor 100 connected to ground to supply proper bias for the transistor 96. In this case the collector of the transistor is connected directly to the conductor 74. A capacitor 102 is connected between the collector and the emitter of the transistor 96. A capacitor 104 is connected between the base and the emitter of the transistor 96. An inductor 106 in the form of an autotransformer is connected between the emitter and ground. The oscillator 18 as thus connected oscillates at a frequency determined by a respective crystal 20 effectively coupled to its frequency-determining circuit by a respective diode switch 24 under the control of the scanning signals developed sequentially on the conductors 52. The oscillator signals are developed on a conductor 108 and applied through a coupling capacitor 110 to the mixer 15.

It is desirable that only the one of the RF sections 9 and 11 be enabled, i.e., turned on, at a time. More particularly it is desirable to enable only that one corresponding to the band of the respective oscillator 16 or 18 for the channel to which the receiver has been tuned by the diode array 22. It would be possible to assign certain positions for the crystals 20 to particular frequency bands; however, it is desirable that it be possible to dispose any channel in either band. To this end, the present invention includes means for utilizing an oscillator output as an indication that that oscillator is operating and hence that the channel to which the receiver is tuned is in the corresponding frequency band. This oscillator signal may then be utilized in accordance with the present invention to operate a band switch including a switching circuit 112 to enable (turn on) a respective amplifier 12, 13.

As illustrated, the switching circuit 112 may comprise a transistor 114 with its collector connected to an output conductor 116 and its emitter connected to ground. The operating signal for the transistor 114 is developed from the autotransformer 106 and the oscillator 18. The autotransformer 106 is utilized to raise the signal level. The signal level is further raised by a voltage-doubling circuit comprising diodes 118 and 120 to which the autotransformer 106 is coupled by a coupling capacitor 122. The voltage-doubling circuit thus acts as a detector to develop a d.c. signal indicative of the presence of beating signals in the oscillator 18. A capacitor 124 is coupled between the base of the transistor 114 and ground, and a capacitor 126 is coupled between the collector of the transistor 114 and ground. When a crystal 20 is coupled to the frequency-determining circuit of the oscillator 18, a signal is developed on the autotransformer 106 which is doubled and rectified by the voltage-doubling circuit to develop a d.c. operating signal to turn on the transistor 114, thus driving the conductor 116 to ground. The ground signal is coupled through a diode 128 to the amplifier 12 to disable, i.e., turn off, that amplifier when the oscillator 18 is producing a beating signal. On the other hand, when the oscillator 18 is not oscillating, the d.c. signal developed by the voltage doubler-detector drops to a low level near ground, and the transistor 114 becomes non-conducting, raising the voltage level on the conductor 116, enabling the amplifier 12.

As shown, the amplifier 12 may comprise an input circuit 132, a first transistor 134, a second transistor 136 and an output circuit 138. The input circuit 132 receives a signal from the antenna 10 and applies a corresponding signal to the first resistor 134 which is biased by voltage applied through a resistor 140 from the power supply 60. The output of the first transistor 134 is applied to the second transistor 136, the collector of which is biased by voltage supplied through a resistor 142 from the power supply 60. This voltage is applied to a voltage divider comprising resistors 144 and 146 connected between the resistor 142 and ground with their junction connected to the base of the second transistor 136. The output of the second transistor 136 is applied by way of the output circuit 138 to a conductor 148 and thence through a coupling capacitor 150 to the mixer 14.

The diode 128 is connected to the base of the transistor 136 so that when a ground signal is developed on the conductor 116 the base of the transistor 136 is grounded, thereby rendering the transistor 136 non-conductive and turning off the amplifier 12. On the other hand, when the conductor 116 is not grounded, a positive voltage is developed thereon which does not pass the diode 128, thus leaving the base of the transistor 136 at its normal bias voltage.

When the oscillator 18 is oscillating, the switching circuit 112 develops a ground signal for the inverted control signal on conductor 116, turning off the amplifier 12. On the other hand, when the oscillator 18 is not oscillating, that is, when no crystal 20 is effectively coupled to its frequency-determining circuit, the switching circuit 112 develops a positive signal for the inverted control signal on the conductor 116, turning on the amplifier 12. As the crystals 20 are disposed in but one or the other of the frequency-determining circuits of the respective oscillators 16 and 18, when the oscillator 18 is oscillating, oscillator 16 is not, and when oscillator 18 is not oscillating, the oscillator 16 is. Consequently, the amplifier 12 is disabled whenever the oscillator 18 is oscillating, for under those circumstances no output should appear from the oscillator 16. On the other hand, when oscillator 18 is not oscillating, the inverted control signal enables the amplifier 12, thus applying signals to the mixer 14 whenever the oscillator 16 may oscillate.

The amplifier 13 is similarly constructed and controlled. As shown, the operation of the amplifier 13 is controlled by a control signal developed by an inverter 152 comprising a transistor 154, a resistor 156 and a capacitor 158. The signal on the conductor 116 is applied to the base of the transistor 154 through the resistor 156 which is part of an integrating circuit including the capacitor 158 connected between the base of the transistor 154 and ground. The emitter of the transistor 154 is also connected to ground. The output of the transistor 154 is developed on a conductor 160 connected to the collector of the transistor 154. The signal developed on the conductor 160 is utilized as a control signal for enabling the amplifier 13.

The amplifier 13, as illustrated, includes an input circuit 162, a first transistor 164, a second transistor 166 and an output circuit 168. The signal received by the antenna 10 is coupled from the input circuit 132 of the amplifier 12 to the input circuit 162 of the amplifier 13. The signal is thence applied to the first transistor 164, which is biased by voltage applied through a resistor 170 from the power supply 60. The output of the transistor 164 is applied to the transistor 166 which is biased by voltage applied through a resistor 172 from the power supply 60. This voltage is applied to the collector of the transistor 166 and to a voltage divider comprising a resistor 174 and a resistor 176 with their common terminals connected to the base of the transistor 166. The output of the transistor 166 is applied through the output ciruit 168 to a conductor 178 and thence through a coupling capacitor 180 to the mixer 15.

The inverter 152 acts upon receipt of a positive signal on the conductor 116 to cause the transistor 154 to become conductive and ground the conductor 160, thus rendering the transistor 166 non-conductive and disabling the amplifier 13. On the other hand, when the conductor 116 is grounded, the transistor 154 is rendered non-conductive thus permitting the conductor 160 to attain its normal bias level rendering the transistor 166 conductive and enabling the amplifier 13.

Thus, when the oscillator 18 oscillates by reason of a crystal 20 being effectively connected to its frequency-determining circuit, the oscillator output is applied over the conductor 108 and through the coupling capacitor 110 to the mixer 15. At the same time the oscillator output causes the transistor 114 to become conductive thus grounding the conductor 116. This causes the transistor 154 to become non-conductive permitting a normal bias voltage to be developed on the conductor 160. The amplifier 13 is thus enabled, causing it to apply a suitably amplified RF signal over the conductor 178 and through the coupling capacitor 180 to the mixer 15. The mixer 15 mixes the amplified RF signal from the amplifier 13 and the signal from the oscillator 18 to produce a suitable IF signal which is then applied to the IF amplifier 30 for processing in the usual manner.

On the other hand, when the oscillator 18 is not oscillating the transistor 114 is non-conductive and a positive inverted control signal is developed on the conductor 116 by the voltage applied through a resistor 182 from the power supply 60. This positive voltage renders the transistor 154 conductive, thus grounding the conductor 160 and disabling the amplifier 13. At the same time the inverted control signal developed on the conductor 116 enables the amplifier 12, thus permitting the amplified output of the amplifier 12 to be applied to the mixer 14 for mixing with the output of the oscillator 16. The mixer 14 then mixes the two signals to produce a suitable IF signal which is applied to the IF amplifier 30 for processing in the usual manner.

Power is supplied to various electronic circuits from the power supply 60.

In FIG. 2 is illustrated a modified form of the invention for four-band operation. As shown in FIG. 2 this form of the invention may utilize the same diode-switching array 22 as utilized in the receiver of FIG. 1. Other switching arrays may be used, as, for example, to provide additional channels. The diode-switching array 22 is operated by signals from a sequential switching system, which may be that illustrated in FIG. 1, for coupling successive ones of crystals 20 sequentially to selected local oscillators 184, 186, 188 and 190. Selection of the particular oscillator may be determined by the physical position of the respective crystals 20. In the receiver illustrated in FIG. 2, there are four different positions in which each crystal 20 may be placed for each channel, each position coupling the crystal to a respective oscillator 184, 186, 188 and 190. That is, for each channel, the crystal may be coupled to the frequency-determining circuit of any one of the four local oscillators 184, 186, 188 and 190. These local oscillators may be like the oscillator 18 illustrated in FIG. 1. Each of the local oscillators 184, 186, 188 and 190 is associated with a respective RF section 192, 194, 196 and 198, each of which comprises a respective RF amplifier 200, 202, 204 and 206 and a respective mixer 208, 210, 212 and 214. Each of these RF amplifiers includes a respective input circuit 216, 218, 220 and 222, and may be of a sort illustrated in FIG. 1 for RF amplifiers 12 or 14. The input circuits 216, 218, 220 and 222 may be connected in series to the antenna 10 whereby the RF signals received by the antenna 10 are applied to all RF amplifiers.

Each of the oscillators 184, 186, 188 and 190 is coupled to a band switch 224, 226, 228 and 230 respectively. Each band switch may be like that illustrated in FIG. 1 comprising a voltage-doubling circuit for detecting the presence of a beat signal output from the respective oscillator to produce a d.c. signal indicative of presence of the signals generated by the respective oscillator. The band switch may further include the transistor 114 for producing an inverted control signal and a further inverter such as the inverter 152 for producing a control signal which may be applied to the respective amplifier 200, 202, 204 or 206 to enable such amplifier, in the manner illustrated for the enabling of the RF amplifier 13 as illustrated in FIG. 1. At the same time the outputs of the respective oscillators 184, 186, 188 and 190 are applied to the respective mixers 208, 210, 212 and 214.

In operation, as the sequential switching means couples crystals 20 successively to the frequency-determining circuits of the respective oscillators 184, 186, 188 and 190, the respective oscillators oscillate at the respective successive frequencies determined by the respective crystals 20. Whichever oscillator 184, 186, 188 and 190 is caused to oscillate, the respective band switch 224, 226, 228 or 230 detects such oscillation and enables the respective RF amplifier 200, 202, 204 or 206, which thereupon amplifies the signal received by the antenna 10. At the same time the output of the respective oscillator 184, 186, 188 or 190 is applied to the respective mixer 208, 210, 212 or 214 for mixing with the amplified RF signal to produce an IF signal. The IF signal then applied to the IF amplifier 30 and further processed in the manner described above in connection with FIG. 1. The various operating voltages may be supplied in a conventional manner.

Other variations may be made by those skilled in the art without departing from the spirit and scope of this invention.

What is claimed is:

1. A signal-seeking receiver which automatically scans a plurality of channels of respective predetermined radio frequencies lying in a plurality of different bands of frequencies and tunes to a received signal having a frequency corresponding to one of said channels, said receiver including an RF section for each of said bands, each such RF section having a mixer, a plurality of local oscillators each for applying beating signals to the mixer of a respective one of said RF sections, a plurality of frequency-determining crystals each corresponding to one of said predetermined frequencies, sequential switching means for automatically coupling successive ones of said frequency-determining crystals sequentially to selected ones of said local oscillators to produce beating signals at respective frequencies beating with said predetermined frequencies to tune in the respective channels, means for selecting to which of said local oscillators a particular one of said crystals is coupled whereby only one of said local oscillators is operable at a time, means coupled to said mixers for producing information signals when a channel is being received, inhibiting means responsive to said information signals for inhibiting said sequential switching means when a channel is being received and stopping the scanning on a receiving channel, and band-switching means for enabling respective RF sections, said band-switching means comprising detector means coupled to one of said local oscillators and responsive to the signals generated thereby to produce a control signal indicative of the presence of signals generated by the local oscillator to which said detector means is coupled, and means responsive to said control signal for enabling the RF section corresponding to the respective local oscillator.

2. A receiver according to claim 1 wherein said band-switching means includes means responsive to said control signal for disabling the RF sections corresponding to at least one other of said local oscillators.

3. A receiver according to claim 1 wherein said band-switching means comprises a plurality of detector means respectively coupled to each of said local oscillators and responsive to the signal generated thereby to produce a control signal indicative of the presence of signals generated by the corresponding local oscillator, and respective means responsive to each of said control signals for enabling the respective RF section corresponding to the respective local oscillator.

4. A receiver according to claim 1 wherein said band-switching means comprises a plurality of detector means respectively coupled to each of said local oscillator means save one and responsive to the signals generated thereby to produce a control signal indicative of the presence of signals generated by the corresponding local oscillator means, means respectively responsive to each of said control signals for activating the RF section corresponding to the respective local oscillator means, the RF section corresponding to said one of said local oscillator means being normally activated, and means responsive to said control signals for turning off said normally activated RF section.

5. A receiver according to claim 1 wherein said detector comprises a voltage doubler circuit coupled to one of said oscillators for producing a d.c. signal indicative of the production of heating signals.

6. A receiver according to claim 5 wherein said detector means further comprises a transistor coupled to said voltage doubler circuit and responsive to said d.c. signal for producing an inverted control signal indicative of the absence of signals generated by the respective local oscillator.

7. A receiver according to claim 6 wherein said detector means further comprises means coupled to said transistor and responsive to said inverted control signal for producing a control signal indicative of the presence of signals generated by the respective local oscillator.

8. A signal-seeking receiver which automatically scans a plurality of channels of respective predetermined radio frequencies lying in two different bands of frequencies and tunes to a received signal having a frequency corresponding to one of said channels, said receiver including an RF section for each of said bands, each such RF section having a mixer, two local oscillators each for applying beating signals to the mixer of a respective one of said RF sections, a plurality of frequency-determining crystals each corresponding to one of said predetermined frequencies, sequential switching means for automatically coupling successive ones of said frequency-determining crystals sequentially to selected ones of said local oscillators to produce beating signals at respective frequencies beating with said predetermined frequencies to tune in the respective channels, means for selecting to which of said local oscillators a particular one of said crystals is coupled whereby only one of said oscillators is operable at a time, means coupled to said mixers for producing information signals when a channel is being received, inhibiting means responsive to said information signals for inhibiting said sequential switching means when a channel is being received and stopping the scanning on a receiving channel, and band-switching means for enabling respective RF sections, said band-switching means comprising detector means coupled to one of said local oscillators and responsive to the signals generated thereby to produce a control signal and an inverted control signal indicative respectively of the presence and absence of signals generated by the local oscillator to which said detector means is coupled, means responsive to said control signal for enabling one of said RF sections, and means responsive to said inverted control signal for enabling the other of said RF sections.

* * * * *

UNITED STATES PATENT AND TRADEMARK OFFICE

CERTIFICATE OF CORRECTION

PATENT NO. : 3,895,303

DATED : July 15, 1975

INVENTOR(S) : Kazuyoshi Imazeki; Masao Nakano

It is certified that error appears in the above-identified patent and that said Letters Patent are hereby corrected as shown below:

Column 2, line 20, "16" should be --15--.

Column 5, line 25, "resistor" should be --transistor--.

Column 8, line 51, Claim 3, "signal" should be --signals--.

Column 9, line 4, Claim 5, "tector comprises" should be --tector means comprises--;

Column 9, line 5, Claim 5, "said oscillators" should be --said local oscillators--;

Column 9, line 6, Claim 5, "heating" should be --beating--;

Column 9, line 14, Claim 7 "comprises means" should be --comprises an inverter means--.

Signed and Sealed this

*seventh* Day of *October 1975*

[SEAL]

*Attest:*

RUTH C. MASON
*Attesting Officer*

C. MARSHALL DANN
*Commissioner of Patents and Trademarks*